June 26, 1923.
F. T. DOW
PEAT MACHINE
Filed Dec. 17, 1921
1,459,907
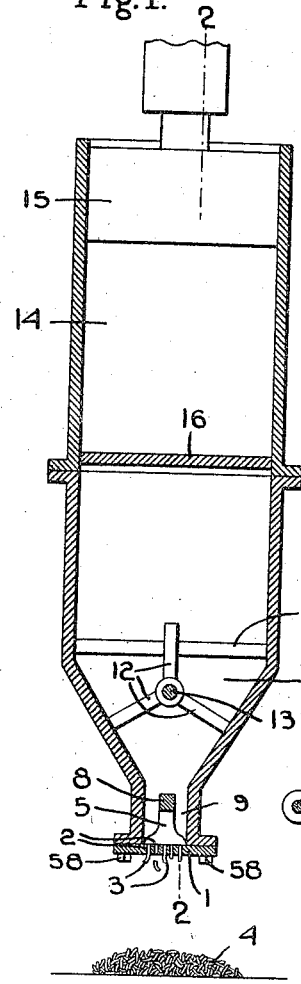
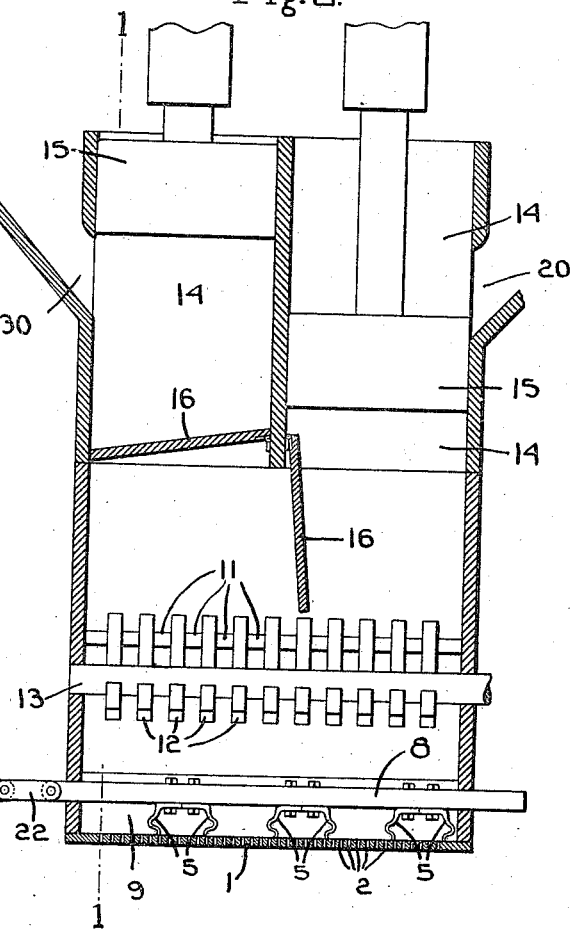
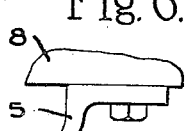
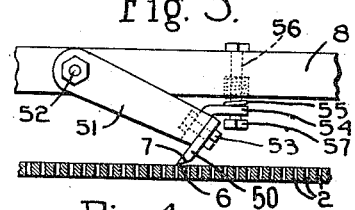
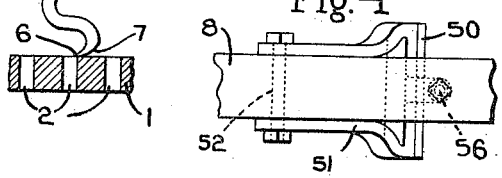
Inventor
Fred T. Dow
by Heard Smith & Tennant
Attys.

Patented June 26, 1923.

1,459,907

UNITED STATES PATENT OFFICE.

FRED T. DOW, OF BANGOR, MAINE.

PEAT MACHINE.

Application filed December 17, 1921. Serial No. 523,200.

*To all whom it may concern:*

Be it known that I, FRED T. Dow, a citizen of the United States, residing at Bangor, county of Penobscot, State of Maine, have invented an Improvement in Peat Machines, of which the following description, in connection with the accompanying drawing, is a specification, like characters on the drawing representing like parts.

As a result of some experiments I have been making with peat, I have discovered that if peat which has been macerated and reduced to a pulpy consistency is then further treated so as to form it into what I call pencil or stick-like fragments, that is, into elongated fragments which are not greater in diameter than one-quarter of an inch, it is then in such condition that it can be readily and rapidly dried, and when dried can be easily formed into briquets of desired size, simply by subjecting it to heat and pressure.

It is the object of my present invention to provide a machine for treating peat and reducing it to the above described stick-like fragments. A machine embodying my invention comprises a member in the form of a perforated plate or screen having small apertures therethrough of the diameter desired for the stick-like fragments and means for rubbing and forcing the peat through said apertures. As the peat is thus forced through these small apertures, it emerges therefrom in small tentaculiferous streams. These separate streams of peat break into short lengths as they emerge from the screen-like member so that the final form which the peat assumes is that of small fragments having the diameter of the holes in the screen-like member and varying lengths. The operation of rubbing the peat through these apertures compresses and condenses the peat so that the peat comprising each small stick-like fragment is pressed compactly together.

This application is a continuation in part of my application Serial No. 338,344, filed November 15, 1919, on which Patent No. 1,414,344 was granted May 2, 1922.

In order to give an understanding of my invention I have illustrated in the drawings some selected embodiments thereof, which will now be described, after which the novel features will be pointed out in the appended claims.

Fig. 1 is a vertical section through an apparatus embodying my invention taken on substantially the line 1—1 Fig. 2.

Fig. 2 is a section taken on the line 2—2, Fig. 1.

Fig. 3 is a fragmentary sectional view showing a different embodiment of my invention from that shown in Fig. 2.

Fig. 4 is a plan view of Fig. 3.

Fig. 5 shows some individual stick-like fragments of peat, such as are produced with this machine.

Fig. 6 is an enlarged view of one of the knives 5.

In the drawings 1 indicates a screen or perforated plate having a plurality of small apertures 2 therethrough. While the size of these apertures is not essential to the invention, yet I find best results are secured when the apertures are about an eighth of an inch to a quarter of an inch in diameter. If peat in a macerated, pulpy condition is forced or rubbed through these apertures 2, it will emerge from the plate 1 in small streams or jets 3, and because of the pressure necessary to force the peat through these apertures, the peat in each stream will be firmly compacted together. As the streams emerge from the apertures they will break off at different lengths to form the stick-like fragments 4, and a considerable proportion of such fragments will curl more or less as they break, so that the resulting mass of stick-like fragments is a more or less porous mass.

Various devices may be employed for forcing or rubbing the peat through the apertures 2. One practical device comprises members in the form of rubbing knives which are arranged to be moved over the upper surface of the screen plate 2, said knives being constructed so that in their movement in one direction they will cut the peat and in their movement in the other direction they act as rubbers to rub the peat through the apertures.

I have shown in the drawings rubbing knives of two different forms. In both forms the active portion of the knife is yieldingly sustained so that it has a yielding pressure against the screen plate 2. In the construction shown in Fig. 2, the rubbing knives are indicated at 5 and each knife is in the form of a curved spring blade having a cutting edge 6 which engages the upper surface of the screen member 1. Each knife is so shaped that the under face 7 thereof forms a rubbing face. When each knife is moving forwardly the cutting edge 6 thereof serves to cut the peat and when it is moving in the opposite direction the rubbing surface 7 has a rubbing action which forces the peat through the apertures 2. I have shown these knives 5 as secured to a reciprocating carrier 8 and as arranged in pairs, the knives of each pair being oppositely directed so that upon movement of the carrier 8 in each direction part of the knives will be cutting the peat and the remainder of the knives will be rubbing the peat through the perforations 2.

The screen plate 1 is shown as forming the bottom of a trough 9 in which the carrier 8 and knives 5 are received, and this trough communicates with a hopper or chamber 10 into which peat may be fed by any suitable means. This hopper or chamber is provided with means for cutting or macerating the peat, such means being herein shown as a plurality of grate bars 11 extending transversely of the hopper, and a plurality of cutting knives 12 which are mounted on a shaft 13 and which co-operate with the bars 11 to cut and macerate the peat. The carrier 8 is of a less width than the trough 9 and the knives 5 will preferably be formed with the wide cutting edge 6 and rubbing surface 7 which extends substantially across the trough 9, and with the narrow shank portion which is secured to the carrier 8. With this construction the carrier 8 and knives do not interfere with the feeding of the peat to the screen member 1.

For feeding the peat to the hopper 10, I have shown a plurality of feeding cylinders 14 leading to the hopper 10, and each provided with a feed plunger 15 for forcing the peat through said cylinder into the hopper. Each cylinder is formed at its lower end with a pivoted gate 16 which opens downwardly automatically as the peat is forced therethrough, but which will close to prevent the peat from being forced upwardly through the cylinder. The cylinders 14 are each provided with an inlet opening 30 through which the material is introduced to the cylinder. The stroke of each piston is such that during its upward movement it uncovers the opening 30 so that material can be introduced into the cylinder beneath the piston, and when the piston descends this material is forced into the hopper 10. The plungers 15 will preferably be operated alternately so that while one plunger is moving downwardly to force peat through its cylinder into the hopper the other plunger will be moving upwardly. The pivoted gates 16 prevent the peat from being forced upwardly through the cylinder in which the pluger is retracting and thus compel the peat to be forced downwardly through the grates 11 into the hopper 10.

The carrier 8 may be reciprated in any suitable way. I have herein shown for this purpose a shaft 20 having a crank arm 21 which is connected by a link 22 to one end of the carrier that projects through the end of the trough 9.

In the construction shown in Figs. 1 and 2 the rubbing knives 5 are resilient so that the resiliency thereof acts to hold the edge of the knife yieldingly against the screen plate.

In Figs. 3 and 4 I have shown a different embodiment of my invention wherein each rubbing knife is carried by a yoke which is pivoted to the carrier 8 and is acted upon by a spring which yieldingly holds the knife against the screen plate 1. The rubbing knives in Figs. 3 and 4 are indicated at 50 and each knife is secured to a yoke 51 which is pivoted to the carrier 8 at 52. The knives are preferably detachably secured to the yoke by means of bolts 53. Each yoke has an ear or projection 54 extending beneath the carrier 8 and a spring 55 is interposed between each ear and the carrier, said spring yieldingly holding the knife against the screen plate. In order to hold the spring in its proper position, I employ a bolt 56 which extends through the spring and through the carrier and also through the ear 54. This bolt has a head 57 at its lower end which serves as a stop to limit the downward swinging movement of the knife whenever the screen plate is removed from the housing. It will be noted that this screen plate is detachably secured to the housing by means of bolts 58, the purpose of this construction being to afford access to the knives. The knives 50 are formed with the rubbing face 7 and with the cutting edge 6, so that they function in the same way as the knives 5.

I claim:

1. The combination with a plate-like member having a plurality of small apertures, of means for cutting peat adjacent the plate and for rubbing the peat through said apertures thereby to produce a peat product in the form of elongated fragments of closely-compacted peat having relatively small diameter.

2. The combination with a closed chamber and means to force peat under pressure into said chamber, of a plate-like member having a plurality of small apertures forming the bottom of said chamber, means within the chamber for cutting the peat adjacent the plate and for rubbing the peat through said apertures thereby to produce a peat product in the form of elongated fragments of closely compacted peat having relatively small diameter.

3. The combination with a plate-like member having a plurality of apertures, of a combined means for cutting peat adjacent the plate and rubbing it through said apertures thereby to produce a peat product in the form of elongated fragments of closely compacted peat having a relatively small diameter.

4. The combination with a plate-like member having a plurality of holes from one-eighth to one-quarter inch in diameter, of rubbing and cutting members, and means to move said members over said plate thereby to cut the peat and rub or force it through the apertures.

5. The combination with a trough-like member having a plurality of small apertures in its bottom, of a plurality of reciprocating combined cutting and rubbing members operating in said trough and contacting with the bottom thereof, and means to reciprocate said cutting and rubbing members thereby to cut the peat when the members are moved in one direction and when moved in the other direction to rub or force it through said apertures.

6. The combination with a trough-like member having a plurality of small apertures in its bottom, of a plurality of reciprocating combined cutting and rubbing members operating in said trough and yieldingly contacting with and extending substantially across the bottom thereof, and means to reciprocate said cutting and rubbing members thereby to cut the peat and rub or force it through substantially all of said apertures.

7. The combination with a trough-like member having a plurality of small apertures in its bottom, of a plurality of reciprocating combined cutting and rubbing members operating in said trough and yieldingly contacting with the bottom thereof, means to reciprocate said cutting and rubbing members thereby to cut the peat when the members are moved in one direction and when moved in the other direction to rub or force it through said apertures, and means to feed peat to said trough.

8. The combination with a trough-like member having a plurality of apertures in its bottom, of a carrier reciprocating in said trough-like member, a plurality of cutting and rubbing members presenting a cutting edge on one side and a rubbing face on the other side sustained by said carriers and operating to cut the material in said trough-like member when moved in one direction and rub it through said aperture when moved in the other direction, and means to reciprocate said carrier.

9. The combination with a trough-like member having a plurality of apertures in its bottom, of a carrier reciprocating in said trough-like member, a plurality of cutting and rubbing members sustained by said carriers and operating to cut the material adjacent the apertures in said trough-like member and rub it through said aperture, means to reciprocate said carrier, means to feed peat or other material to said trough-like member, and rotatable cutters between the feeding means and the carrier for cutting or macerating said material.

10. The combination with a trough-like member having a plurality of apertures in its bottom, of a carrier secured in said trough-like member and a plurality of pairs of cutting and rubbing members sustained by said carrier each member presenting a cutting edge and a rubbing face so arranged that in a single pair the cutting edge of one member and the rubbing face of the other member operate when moved on each stroke to cut the material in the trough-like member and rub it through said apertures.

In testimony whereof, I have signed my name to this specification.

FRED T. DOW.